United States Patent
Sonoda et al.

(10) Patent No.: US 7,797,921 B2
(45) Date of Patent: Sep. 21, 2010

(54) CONTROL APPARATUS OF EXTRACTED AIR BOOSTER SYSTEM OF INTEGRATED GASIFICATION COMBINED CYCLE POWER PLANT

(75) Inventors: Takashi Sonoda, Takasago (JP); Masaaki Yamasaki, Takasago (JP); Satoko Fujii, Takasago (JP); Kiyoshi Tarumizu, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 966 days.

(21) Appl. No.: 11/605,392

(22) Filed: Nov. 29, 2006

(65) Prior Publication Data

US 2007/0125064 A1    Jun. 7, 2007

(51) Int. Cl.
*F02C 3/26* (2006.01)
*F02C 9/18* (2006.01)
*F02C 9/20* (2006.01)

(52) U.S. Cl. .................... 60/39.12; 60/785; 60/795; 60/794

(58) Field of Classification Search ............. 60/39.23, 60/39.12, 780, 785, 794, 795
See application file for complete search history.

(56) References Cited

U.S. PATENT DOCUMENTS 4,380,893 A * 4/1983 Stokes et al. ............... 60/785
4,834,622 A * 5/1989 Schuh ........................ 417/307
5,117,625 A * 6/1992 McArthur et al. ............. 60/785
5,581,128 A * 12/1996 Royle ...................... 60/39.12

FOREIGN PATENT DOCUMENTS

| JP | 5-248260 A | 9/1993 |
| JP | 6-58109 A | 3/1994 |
| JP | 8-74517 A | 3/1996 |
| JP | 9-96227 A | 4/1997 |
| JP | 9-195718 A | 7/1997 |
| JP | 2001-152871 A | 6/2001 |
| JP | 2002-502941 A | 1/2002 |

* cited by examiner

*Primary Examiner*—Ted Kim
(74) *Attorney, Agent, or Firm*—Birch, Stewart, Kolasch & Birch, LLP

(57) ABSTRACT

A control apparatus of an extracted air booster system of an integrated gasification combined cycle power plant can additionally serve a sufficient pressure control function and a sufficient antisurge control function. For example, when an inlet guide vane is fully closed or has a small opening degree equal to or smaller than a predetermined opening degree, a second control section of the control apparatus performs pressure control based on a pressure deviation, instead of or as well as antisurge control. In the pressure control, the degree of opening of an antisurge valve is controlled so that a booster outlet pressure detection value can become equal to a set pressure value. In a case where a pressure ratio is larger than a set pressure ratio value, it is also effective that the second control section performs the antisurge control even when the inlet guide vane is fully closed.

16 Claims, 7 Drawing Sheets

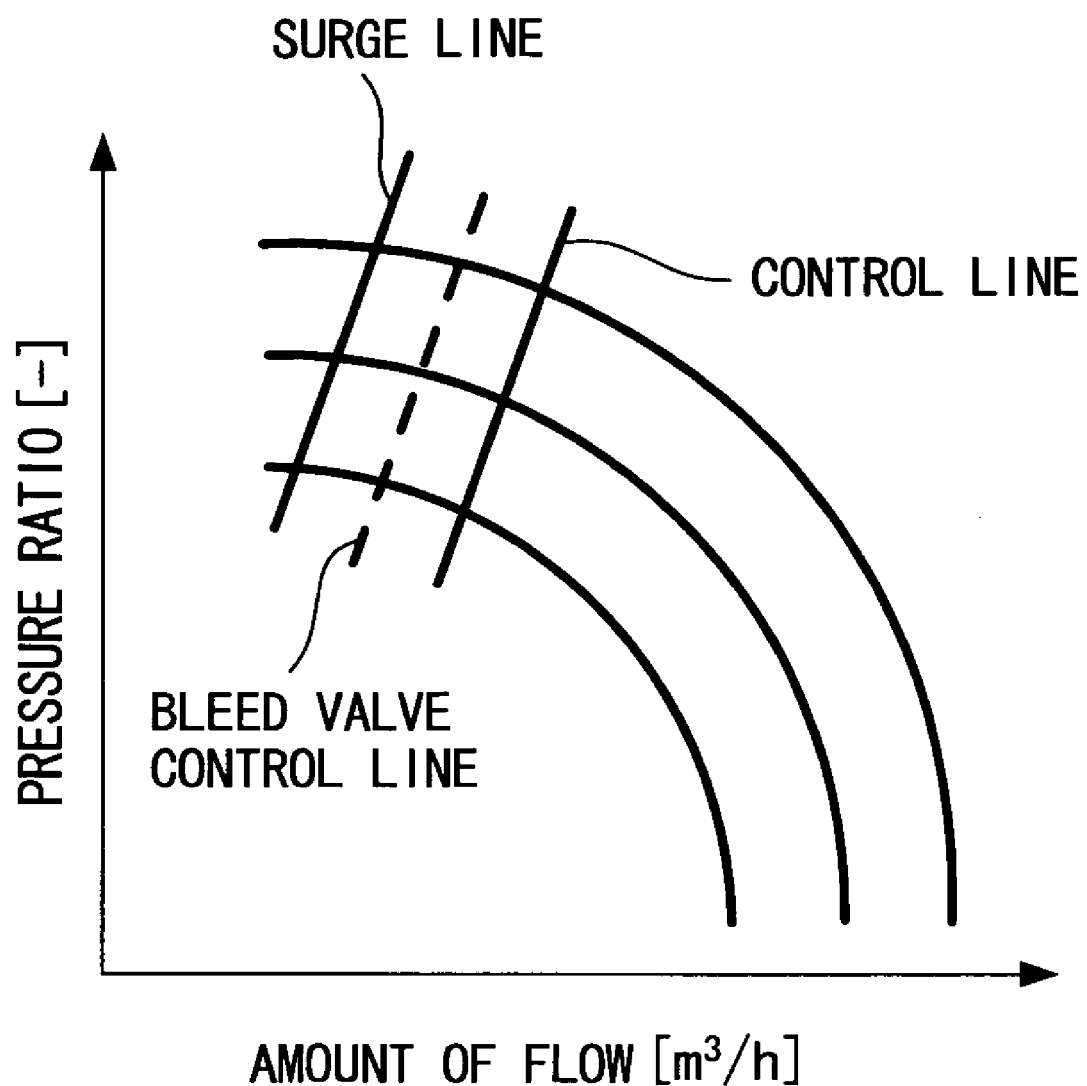

CONTROL APPARATUS OF EXTRACTED AIR BOOSTER SYSTEM OF INTEGRATED GASIFICATION COMBINED CYCLE POWER PLANT

BACKGROUND OF THE INVENTION

1. Field of the Invention

The present invention relates to a control apparatus of an extracted air booster system of an integrated gasification combined cycle power plant. Specifically, the present invention relates to control of degrees of opening respectively of an inlet guide vane and an antisurge valve (pressure control and antisurge control) of the extracted air booster system.

2. Description of the Related Art

An integrated gasification combined cycle power plant is a new type of power plant which is being currently developed for commercialization. A feature of such an integrated gasification combined cycle power plant is that a gasification system and a gas turbine system, which are principal components thereof, supply gas and air to each other.

Accordingly, an integrated gasification combined cycle power plant is provided with an extracted air booster system. In the extracted air booster system, air (compressed air) which is extracted from a compressor of a gas turbine system is further pressurized by an extracted air booster, and then the pressurized air is sent to a gasification furnace of a gasification system.

The extracted air booster system includes the extracted air booster, an inlet guide vane and an antisurge valve (recirculation valve). The extracted air booster pressurizes air extracted from the compressor driven by a gas turbine of the gas turbine system, and supplies the extracted air thus pressurized to the gasification furnace. The inlet guide vane is provided to an inlet side of the extracted air booster, and the antisurge valve returns the extracted air from an outlet side of the extracted air booster to the inlet side of the extracted air booster.

In order to set the pressure of the extracted air to be supplied to the gasification furnace at a predetermined pressure, and to perform surge protection for the extracted air booster, a control apparatus of the extracted air booster system performs pressure control and antisurge (surge prevention) control. In the pressure control, based on a pressure deviation between a set pressure value and an outlet pressure detection value of the extracted air booster, the degree of opening of the inlet guide vane is controlled so that the outlet pressure detection value can become equal to the set pressure value. In the antisurge control, based on a pressure ratio deviation between a set pressure ratio value and a pressure ratio of the outlet pressure detection value of the extracted air booster to an inlet pressure detection value of the extracted air booster, the degree of opening of the antisurge valve is controlled so that the pressure ratio can become equal to the set pressure ratio value.

The extracted air booster is an apparatus for pressurizing air extracted from the compressor of the gas turbine system to a predetermined pressure suitable for supplying the extracted air to the gasification furnace. Since the gasification furnace is operated at a constant pressure, the control apparatus of the extracted air booster system performs pressure control so that the outlet pressure of the extracted air booster can become equal to the set pressure by controlling the degree of opening of the inlet guide vane, as described above. Moreover, since the gasification furnace is operated at a constant pressure, the pressure ratio of the extracted air booster increases and comes closer to a surge region, as a load decreases. Accordingly, a difficult operating situation occurs in the extracted air booster. To cope with this, the control apparatus of the extracted air booster system controls the degree of opening of the antisurge valve as described above to perform antisurge control so that the pressure ratio of the extracted air booster can become equal to the set pressure ratio.

Prior art documents which disclose a method and the like of controlling an extracted air booster system of such an integrated gasification combined cycle power plant include, for example, Japanese Unexamined Patent Application Publication No. H5-248260 and Japanese Unexamined Patent Application Publication No. H9-96227.

However, the control of an extracted air booster system of an integrated gasification combined cycle power plant has not yet been sufficiently established.

To be more detailed, in a conventional system or the like in which natural gas is pressurized by a gas compressor to be supplied to a gas turbine, the capacity of the gas compressor is not tight. Accordingly, the control of a recirculation valve is the main operation, and an inlet guide vane is operated only during a high-load period in which the recirculation valve is fully closed. However, an extracted air booster system of an integrated gasification combined cycle power plant does not have enough margin of operation because of its small system capacity. For this reason, the inlet guide vane needs to be actively operated to enlarge the control range.

For this reason, as described previously, the following role sharing has been employed: an inlet guide vane is used for a pressure control function, and an antisurge valve (recirculation valve) is used for an antisurge control function. However, there have been problems including the inlet guide vane being incapable of serving a sufficient pressure control function by itself.

SUMMARY OF THE INVENTION

Accordingly, in view of the above-described circumstances, an object of the present invention is to provide a control apparatus of an extracted air booster system of an integrated gasification combined cycle power plant, the control apparatus being capable of serving a sufficient pressure control function, and being further capable of serving a sufficient antisurge control function (i.e., being capable of establishing a surge protection function and a pressure control function for an extracted air booster over the entire operation of the plant.)

In order to achieve the above-described object, a first aspect of the present invention is a control apparatus of an extracted air booster system of an integrated gasification combined cycle power plant. The extracted air booster system includes an extracted air booster, an inlet guide vane and an antisurge valve. The extracted air booster pressurizes air extracted from a compressor driven by a gas turbine, and supplies the extracted air to a gasification furnace. The inlet guide vane is provided to an inlet side of the extracted air booster, and the antisurge valve returns the extracted air from an outlet side of the extracted air booster to the inlet side of the extracted air booster. The control apparatus includes a first control section and a second control section. The first control section performs pressure control. In the pressure control, a degree of opening of the inlet guide vane is controlled based on a pressure deviation between a set pressure value and an outlet pressure detection value of the extracted air booster so that the outlet pressure detection value can become equal to the set pressure value. The outlet pressure detection value is detected by a first pressure detector. The second control section performs antisurge control. In the antisurge control, a degree of opening of the antisurge valve is controlled based on a pressure ratio deviation between a set pressure ratio value and a pressure ratio of the outlet pressure detection value of the extracted air booster to an inlet pressure detection value of the extracted air booster so that the pressure ratio can become equal to the set pressure ratio value. The outlet pressure detection value is detected by the first pressure detector, and the inlet pressure detection value is detected by a second pressure detector. When the inlet guide vane is fully closed or has a low opening degree equal to or smaller than a predetermined opening degree, based on the pressure deviation, the second control section performs the pressure control instead of or as well as the antisurge control. In the pressure control, the degree of opening of the antisurge valve is controlled so that the outlet pressure detection value can become equal to the set pressure value.

A second aspect of the present invention is the control apparatus according to the first aspect of the present invention. In the control apparatus, when both the antisurge control based on the pressure ratio deviation and the pressure control based on the pressure deviation are performed, the second control section adjusts a ratio between the antisurge control and the pressure control, based on the degree of opening of the inlet guide vane.

A third aspect of the present invention is the control apparatus according to any one of the first and second aspects of the present invention. In the control apparatus, in a case where the pressure ratio is larger than the set pressure ratio value, the second control section performs the antisurge control even when the inlet guide vane is fully closed.

A fourth aspect of the present invention is the control apparatus according to any one of the first to third aspects of the present invention. In the control apparatus, the first control section incorporates a delay taking account of a response delay of the plant into the set pressure value which is set by using a load command as an input.

A fifth aspect of the present invention is the control apparatus according to any one of the first to fourth aspects of the present invention. In the control apparatus, when the degree of opening of the antisurge valve is larger than a first predetermined opening degree, and concurrently when the degree of opening of the inlet guide vane is an opening degree corresponding to a fully closed state or is smaller than a second predetermined opening degree which is equal to or smaller than the predetermined opening degree, the first control section determines that the pressure is controlled using the antisurge valve, and does not control the degree of opening of the inlet guide vane based on the pressure deviation is not performed.

A sixth aspect of the present invention is the control apparatus according to any one of the first to fifth aspects of the present invention. In the control apparatus, when the pressure ratio deviation is equal to or larger than a predetermined value, the second control section vents the extracted air, which is compressed by the extracted air booster, to the atmosphere by opening a bleed valve provided in the extracted air booster system.

In the control apparatus of the extracted air booster system of the integrated gasification combined cycle power plant according to the first aspect of the present invention, when the inlet guide vane is fully closed or has a small opening degree equal to or smaller than a predetermined opening degree, based on the pressure deviation, the second control section performs pressure control instead of or as well as the antisurge control. In the pressure control, the degree of opening of the antisurge valve is controlled so that the outlet pressure detection value can become equal to the set pressure value. Accordingly, pressure control can be backed not only by using the inlet guide vane but also by using the antisurge valve, and thus the inlet guide vane and the antisurge valve can serve a sufficient pressure control function.

In the control apparatus of the extracted air booster system of the integrated gasification combined cycle power plant according to the second aspect of the present invention, when both the antisurge control based on the pressure ratio deviation and the pressure control based on the pressure deviation are performed, the second control section adjusts a ratio between the antisurge control and the pressure control, based on the degree of opening of the inlet guide vane. Accordingly, the control of the degree of opening of the antisurge valve based on the pressure deviation and the pressure ratio deviation can be more appropriately performed.

In the control apparatus of the extracted air booster system of the integrated gasification combined cycle power plant according to the third aspect of the present invention, in a case where the pressure ratio is larger than the set pressure ratio value, the second control section performs the antisurge control even when the inlet guide vane is fully closed. Accordingly, in the case where the inlet guide vane is fully closed, the second control section basically performs pressure control using the antisurge valve. However, when there is a risk of entry into a surge region, the second control section also performs antisurge control using the antisurge valve in addition to pressure control. This can prevent the entry into the surge region more reliably. Accordingly, the extracted air booster can be protected.

In the control apparatus of the extracted air booster system of the integrated gasification combined cycle power plant according to the fourth aspect of the present invention, the first control section incorporates a delay taking account of a response delay of the plant into the set pressure value which is set by using a load command as an input. This can prevent impractical operations (of the inlet guide vane and the antisurge valve) from being performed, and produces the effect of stabilizing the dynamic behavior of the plant.

In the control apparatus of the extracted air booster system of the integrated gasification combined cycle power plant according to the fifth aspect of the present invention, when the degree of opening of the antisurge valve is larger than a first predetermined opening degree and the degree of opening of the inlet guide vane is an opening degree corresponding to a fully closed state or is smaller than a second predetermined opening degree equal to or smaller than the predetermined opening degree, the first control section determines that pressure control is being performed using the antisurge valve, and does not perform the control of the degree of opening of the inlet guide vane based on the pressure deviation. This can prevent the antisurge valve and the inlet guide vane from simultaneously operating. Accordingly, mutual interference therebetween can be prevented.

In the control apparatus of the extracted air booster system of the integrated gasification combined cycle power plant according to the sixth aspect of the present invention, when the pressure ratio deviation is equal to or larger than a predetermined value, the second control section vents the extracted air, which is compressed by the extracted air booster, to the atmosphere by opening a bleed valve provided in the extracted air booster system. Accordingly, the antisurge control function can be backed by the bleed valve, and the surge protection function for the extracted air booster can be enhanced.

BRIEF DESCRIPTION OF THE DRAWINGS

The present invention will become more fully understood from the detailed description given hereinbelow and the accompanying drawings which are given by way of illustration only, and thus are not limitative of the present invention and wherein;

FIG. 7 is a graph showing a bleed valve control line.

DETAILED DESCRIPTION OF THE INVENTION

Hereinafter, embodiments of the present invention will be described in detail with reference to the accompanying drawings.

First Embodiment

Figure 1:
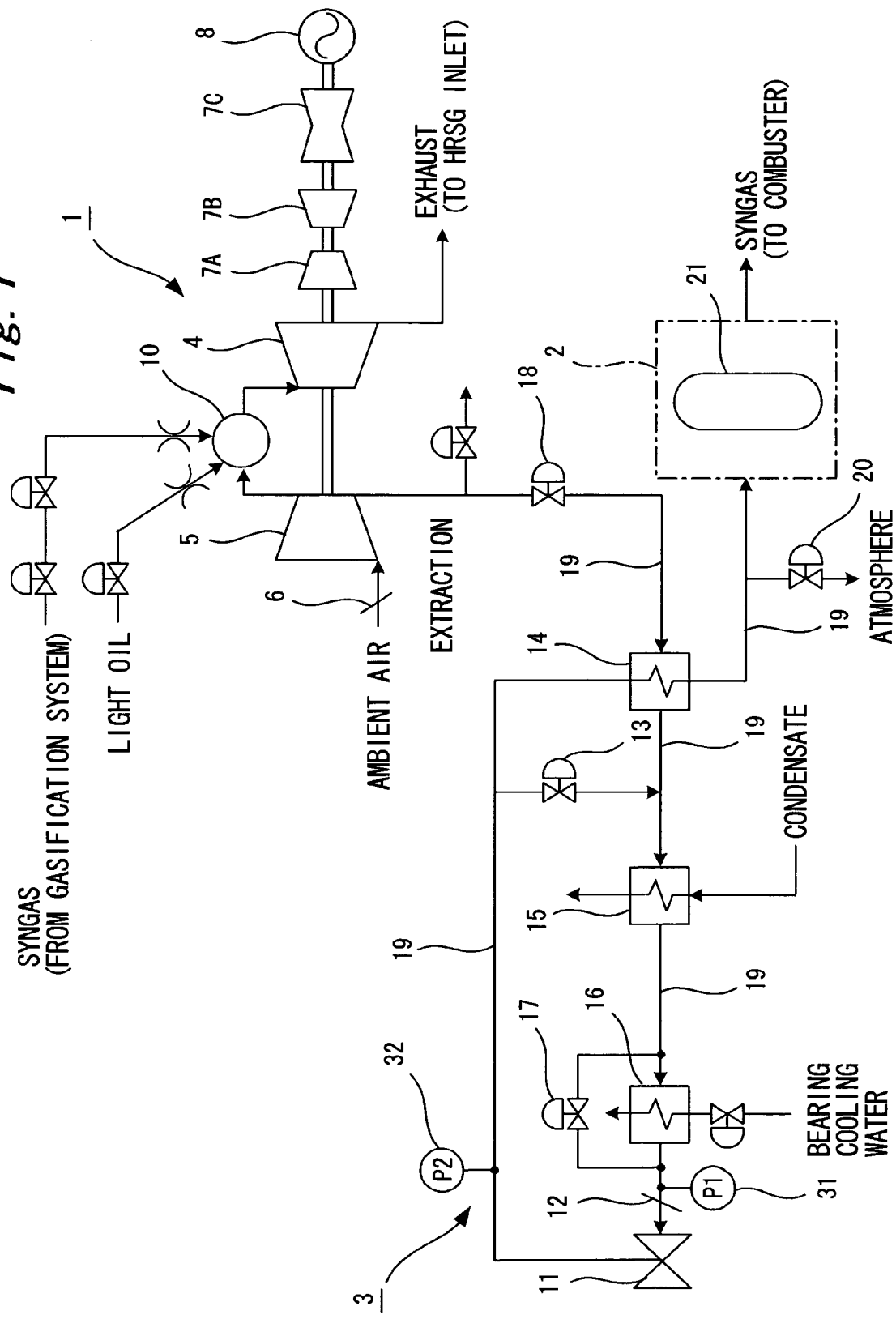
FIG. 1 is a diagram showing a configuration of a principal part of an integrated gasification combined cycle power plant.
Figure 2:
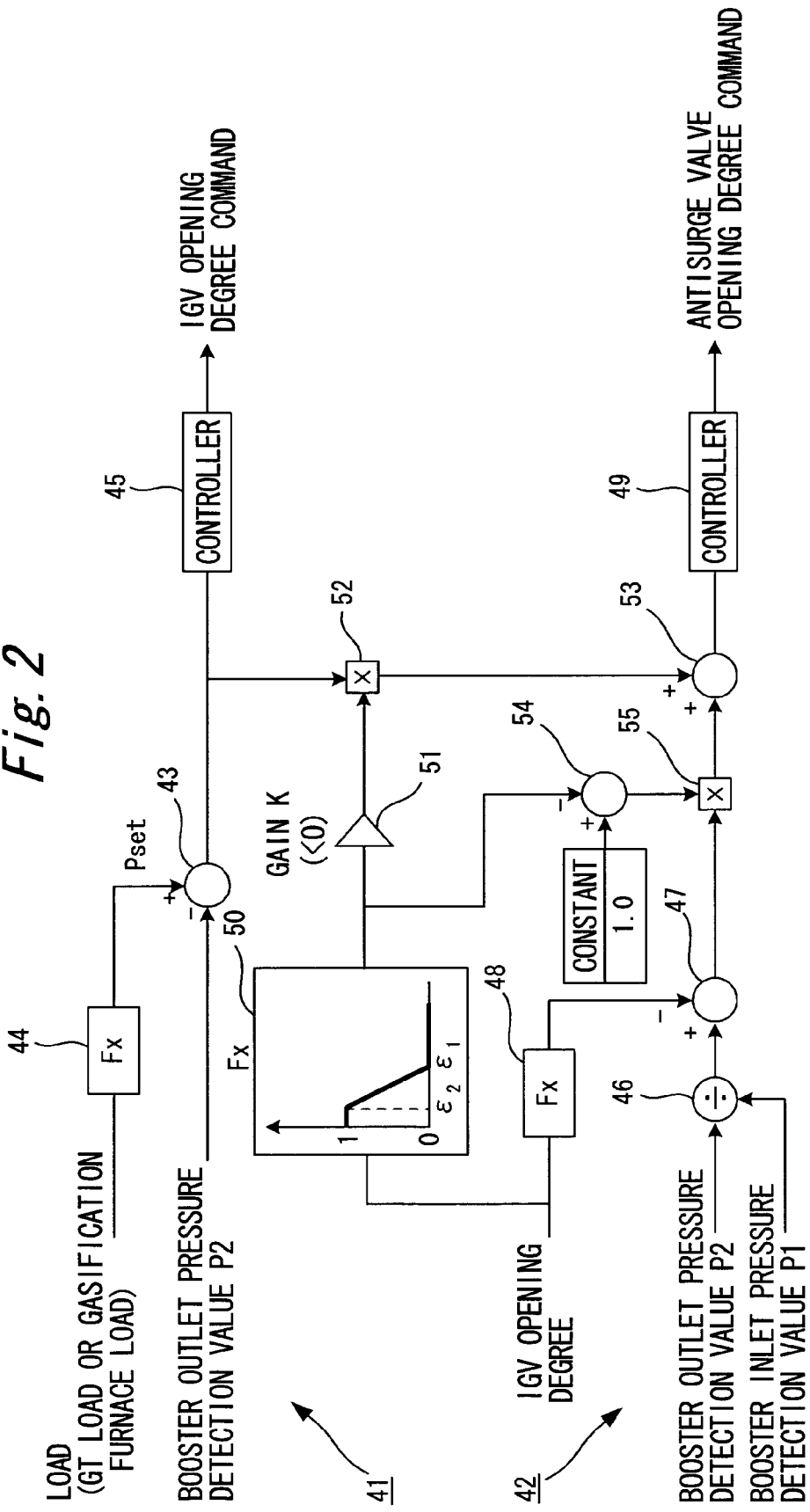
FIG. 2 is a block diagram showing a configuration of a control apparatus of an extracted air booster system of the integrated gasification combined cycle power plant according to a first embodiment of the present invention.

FIG. 1 is a diagram showing a configuration of a principal part of an integrated gasification combined cycle power plant. FIG. 2 is a block diagram showing a configuration of a control apparatus of an extracted air booster system of the integrated gasification combined cycle power plant according to a first embodiment of the present invention.

As shown in FIG. 1, the integrated gasification combined cycle power plant includes a gas turbine system 1, a gasification system 2, and an extracted air booster system 3. The gas turbine system 1 includes a gas turbine (GT) 4, a compressor 5 which is rotationally driven by the gas turbine 4, and a combustor 10. The compressor 5 pressurizes ambient air introduced therein through an inlet guide vane 6 to supply the pressurized air to the combustor 10. In the combustor 10, the compressed air supplied from the compressor 5 and fuel are mixed and combusted to generate high-temperature, high-pressure combustion gas. The gas turbine 4 is rotationally driven by the high-temperature, high-pressure combustion gas supplied from the combustor 10. As the fuel, light oil supplied from an unillustrated light oil supply system is used at startup, and fuel gas (syngas) generated by the gasification system 2 is used during operation after startup.

Exhaust (combustion gas) discharged from the gas turbine 4 is sent to an unillustrated heat recovery steam generator (HRSG), where steam is generated by heat exchange between the exhaust and water. To a rotating shaft of the gas turbine 4, respective rotating shafts of high-pressure, intermediate-pressure, and low-pressure steam turbines 7A, 7B, and 7C and a rotating shaft of an electric generator 8 are connected. The steam turbines 7A, 7B, and 7C are rotationally driven by steam generated by the heat recovery steam generator, and the electric generator 8 is rotationally driven by the gas turbine 4 and the steam turbines 7A, 7B and 7C to generate electric power. It should be noted that a system configuration in which electric power is generated with the gas turbine and the steam turbines respectively having different shafts can also be employed.

The extracted air booster system 3 includes an extracted air booster 11, an inlet guide vane (IGV) 12, an antisurge valve (recirculation valve) 13, extracted air heat exchangers 14, 15 and 16, a bypass valve 17 for bypassing the extracted air heat exchanger 16, a gas turbine extraction valve 18, a bleed valve 20, pipes 19 for connecting these members, and the like. The extracted air booster system 3 also includes a control apparatus for controlling the degrees of openings respectively of the inlet guide vane 12 and the antisurge valve 13 to perform pressure control and antisurge control, which will be described in detail later.

In the extracted air booster system 3, the extracted air (compressed air) extracted from the compressor 5 of the gas turbine system 1 through the gas turbine extraction valve 18 is cooled by heat exchange with the extracted air after pressurization, condensate, and bearing cooling water in this order respectively in the extracted air heat exchangers 14, 15 and 16, and then the extracted air is pressurized by the extracted air booster 11. This extracted air pressurized by the extracted air booster 11 is heated by heat exchange with the extracted air before pressurization in the extracted air heat exchanger 14 as described previously. Then, the extracted air thus pressurized is supplied to an air-blown gasification furnace 21 of the gasification system 2. The bleed valve 20 is connected to an intermediate point of the pipe 19 connected between the extracted air heat exchanger 14 and the gasification furnace 21, and opening the bleed valve 20 allows the extracted air to be vented to the atmosphere.

The inlet guide vane 12 is provided to the inlet side of the extracted air booster 11. The amount of the extracted air which flows into the extracted air booster 11 is adjusted by adjusting the degree of opening of the inlet guide vane 12. It should be noted that even when the inlet guide vane 12 is fully closed (minimum opening degree), the degree of opening thereof does not become 0% and the inlet guide vane 12 still has a certain opening degree (e.g., 30%, 50% or the like). The inlet and outlet sides of the antisurge valve 13 are connected respectively to the outlet and inlet sides of the extracted air booster 11, and the antisurge valve 13 returns the extracted air from the outlet side of the extracted air booster 11 to the inlet side of the extracted air booster 11 (recirculates the extracted air). The outlet side of the antisurge valve 13 is connected to the pipe 19 between the extracted air heat exchangers 14 and 15. It should be noted that the degree of opening of the antisurge valve 13 ranges from 0% to 100%.

On the inlet and outlet sides of the extracted air booster 11, a second pressure detector 31 and a first pressure detector 32 are respectively provided. The second pressure detector 31 detects booster inlet pressure (booster inlet pressure detection value P1) which is the pressure of the extracted air flowing into the extracted air booster 11, and the first pressure detector 32 detects booster outlet pressure (booster outlet pressure detection value P2) which is the pressure of the extracted air ejected from the extracted air booster 11 (the extracted air pressurized by the extracted air booster 11). The booster inlet pressure detection value P1 of the second pressure detector 31 and the booster outlet pressure detection value P2 of the first pressure detector 32 are inputted to the control apparatus of the extracted air booster system 3 (see FIG. 2).

In the gasification system 2, in the gasification furnace 21, the extracted air supplied from the extracted air booster system 3 (extracted air booster 11) is mixed with pulverized coal supplied from an unillustrated pulverized coal supply system, the resultant mixture is combusted using an unillustrated pulverized coal burner to generate combustion gas (syngas), and this combustion gas is supplied as fuel to the combustor 10 of the gas turbine system 1.

Here, referring to FIG. 2, the configuration of the control apparatus of the extracted air booster system 3 will be described. As shown in FIG. 2, the control apparatus of the extracted air booster system 3 includes a first control section 41 and a second control section 42.

In the first control section 41, first, a deviation computing section 43 obtains a pressure deviation $\Delta P$ which is the difference between the booster outlet pressure detection value P2 of the extracted air booster 11 and a set pressure value Pset. The set pressure value Pset is defined as a function of a load command (gas turbine load command or gasification furnace load command), and is set by a function computing section 44 computing the function based on the load command.

Subsequently, a controller 45 of the first control section 41, which is a proportional-integral (PI) controller or the like, outputs an inlet guide vane opening degree command to the inlet guide vane 12. By the inlet guide vane opening degree command, the degree of opening of the inlet guide vane 12 is controlled so that the booster outlet pressure detection value P2 becomes equal to the set pressure value Pset, based on the pressure deviation $\Delta P$. That is, pressure control is performed. It should be noted that the degree of opening of the inlet guide vane 12 needs to be increased when the booster outlet pressure is raised, and that the degree of opening of the inlet guide vane 12 needs to be decreased when the booster outlet pressure is reduced. Accordingly, the deviation computing section 43 computes the pressure deviation $\Delta P$ with the set pressure value Pset assumed to be positive (+) and the booster outlet pressure detection value P2 assumed to be negative (−).

In the second control section 42, first, a pressure ratio computing section (division section) 46 divides the booster outlet pressure detection value P2 by the booster inlet pressure detection value P1 to obtain a pressure ratio P2/P1, and then a deviation computing section 47 obtains a pressure ratio deviation $\Delta P2/P1$ which is the difference between the pressure ratio P2/P1 and a set pressure ratio value P2/P1set. The set pressure ratio value P2/P1set is defined as a function of the degree of opening of the inlet guide vane 12, and is set by a function computing section 48 computing the function based on the degree of opening of the inlet guide vane 12. It should be noted that as the degree of opening of the inlet guide vane 12, the inlet guide vane opening degree command outputted from the controller 45 of the first control section 41, a detection value of an opening degree detector for detecting the degree of opening of the inlet guide vane 12, or the like can be used.

Then, a controller 49 of the second control section 42, which is a proportional-integral (PI) controller or the like, outputs an antisurge valve opening degree command to the antisurge valve 13. By the antisurge valve opening degree command, the degree of opening of the antisurge valve 13 is controlled so that the pressure ratio P2/P1 becomes equal to the set pressure ratio value P2/P1set, based on the pressure ratio deviation $\Delta P2/P1$ (actually, based on an output value of an add section 53, which will be described in detail later). That is, antisurge control is performed. It should be noted that the degree of opening of the antisurge valve 13 needs to be decreased when the pressure ratio (booster outlet pressure) is increased, and that the degree of opening of the antisurge valve 13 needs to be increased when the pressure ratio (booster outlet pressure) is decreased. Accordingly, the deviation computing section 47 computes the pressure ratio deviation $\Delta P2/P1$ with the set pressure ratio value P2/P1set assumed to be negative (−) and the pressure ratio P2/P1 assumed to be positive (+).

In order to enable the antisurge valve 13 to back pressure control, the second control section 42 further includes a function computing section 50, a gain section 51, a multiplication section 52, an add section 53, a deviation computing section 54, and a multiplication section 55.

The function computing section 50 receives the degree of opening of the inlet guide vane 12, and outputs a value of 0 to 1 depending on this inlet guide vane opening degree. That is, in the case where the inlet guide vane opening degree is equal to or larger than a predetermined opening degree $\epsilon_1$, the function computing section 50 outputs 0. On the other hand, in the case where the inlet guide vane opening degree becomes a low opening degree equal to or smaller than the predetermined opening degree $\epsilon_1$, the function computing section 50 outputs a value of 0 to 1 depending on the opening degree when the inlet guide vane opening degree is in the range of the predetermined opening degree $\epsilon_1$ to a predetermined opening degree $\epsilon_2$, or outputs 1 when the inlet guide vane opening degree is in the range of the predetermined opening degree $\epsilon_2$ to the opening degree corresponding to the fully closed state.

The gain section 51 outputs a value obtained by multiplying the value outputted from the function computing section 50 by a predetermined negative gain K. The multiplication section 52 outputs a value obtained by multiplying the negative output value from the gain section 51 by the pressure deviation $\Delta P$ outputted from the deviation computing section 43 of the first control section 41. The gain K of the gain section 51 is a value set so that the pressure deviation $\Delta P$ is changed to the same signal level (fluctuation range) as the pressure ratio deviation $\Delta P2/P1$. The purpose in setting the gain K negative is to reverse the sign of the pressure deviation $\Delta P$ since as described previously, the degree of opening of the antisurge valve 13 needs to be decreased when the booster outlet pressure is raised and needs to be increased when the booster outlet pressure is reduced.

On the other hand, the deviation computing section 54 outputs a value obtained by subtracting the output value of the function computing section 50 from the constant 1.0. The multiplication section 55 outputs a value obtained by multiplying the output value from the deviation computing section 54 by the pressure ratio deviation $\Delta P2/P1$ outputted from the deviation computing section 47. The add section 53 outputs a value obtained by adding the output value from the multiplication section 55 and the output value from the multiplication section 52. As described previously, based on the output value of the add section 53, the controller 49 performs antisurge control and pressure control. In the antisurge control, the controller 49 outputs an antisurge valve opening degree command to the antisurge valve 13. With the antisurge valve opening degree command, the degree of opening of the antisurge valve 13 is controlled so that the pressure ratio P2/P1 becomes equal to the set pressure ratio value P2/P1set. In the pressure control, the controller 49 outputs an antisurge valve opening degree command to the antisurge valve 13. With the antisurge valve opening degree command, the degree of opening of the antisurge valve 13 is controlled so that the booster outlet pressure detection value P2 becomes equal to the set pressure value Pset.

That is, when the value outputted from the function computing section 50 is 0, the output value from the multiplication section 52 becomes 0 and, on the other hand, the multiplication section 55 directly outputs the value of the pressure ratio deviation $\Delta P2/P1$. Accordingly, the add section 53 also directly outputs the value of the pressure ratio deviation $\Delta P2/P1$. Thus, based on the pressure ratio deviation $\Delta P2/P1$, the controller 49 performs antisurge control in which the degree of opening of the antisurge valve 13 is controlled so that the pressure ratio P2/P1 becomes equal to the set pressure ratio value P2/P1set.

In addition, when the value outputted from the function computing section 50 is a value larger than 0 and smaller than 1, a value obtained by multiplying the relevant value and the gain K by the pressure deviation $\Delta P$ is outputted from the multiplication section 52, and the multiplication section 55 outputs a value obtained by multiplying the pressure ratio deviation $\Delta P2/P1$ by a value obtained by subtracting the relevant value from the constant 1.0. For this reason, the add section 53 outputs a value obtained by adding the output value from the multiplication section 52 and the output value from the multiplication section 55. Consequently, the controller 49 performs both antisurge control and pressure control. In the antisurge control, the degree of opening of the antisurge valve 13 is controlled based on the pressure ratio deviation $\Delta P2/P1$ so that the pressure ratio P2/P1 becomes equal to the set pressure ratio value P2/P1set. In the pressure control, the degree of opening of the antisurge valve 13 is controlled based on the pressure deviation $\Delta P$ so that the booster outlet pressure detection value P2 becomes equal to the set pressure value Pset. Also, the ratio (weighting) between the antisurge control and the pressure control is adjusted based on the inlet guide vane opening degree.

Moreover, when the value outputted from the function computing section 50 is 1, the output value from the multiplication section 55 becomes 0 and, on the other hand, the multiplication section 52 directly outputs the value of the pressure deviation $\Delta P$ in which only the signal level is adjusted using the gain K. For this reason, the add section 53 also directly outputs the value of the pressure deviation $\Delta P$. Accordingly, the controller 49 performs pressure control. In the pressure control, the degree of opening of the antisurge valve 13 is controlled based on the pressure deviation $\Delta P$, so that the booster outlet pressure detection value P2 becomes equal to the set pressure value Pset.

As described above, in the control apparatus of the extracted air booster system of the integrated gasification combined cycle power plant of this first embodiment, when the degree of opening of the inlet guide vane 12 becomes the opening degree corresponding to the fully closed state or a low opening degree equal to or smaller than a predetermined opening degree, the second control section 42 performs pressure control. In the pressure control, the degree of opening of the antisurge valve 13 is controlled based on the pressure deviation $\Delta P$, so that the booster outlet pressure detection value P2 becomes equal to the set pressure value Pset. The pressure control is performed instead of or as well as antisurge control. Accordingly, pressure control can be backed not only by using the inlet guide vane 12 but also by using the antisurge valve 13. Thus, the inlet guide vane 12 and the antisurge valve 13 serve a sufficient pressure control function.

Furthermore, when the second control section 42 performs both antisurge control based on the pressure ratio deviation $\Delta P2/P1$ and pressure control based on the pressure deviation $\Delta P$, the ratio between the antisurge control and the pressure control is adjusted based on the degree of opening of the inlet guide vane 12. Accordingly, the control of the degree of opening of the antisurge valve 13 based on the pressure deviation and the pressure ratio deviation can be more appropriately performed.

Second Embodiment

Figure 3:
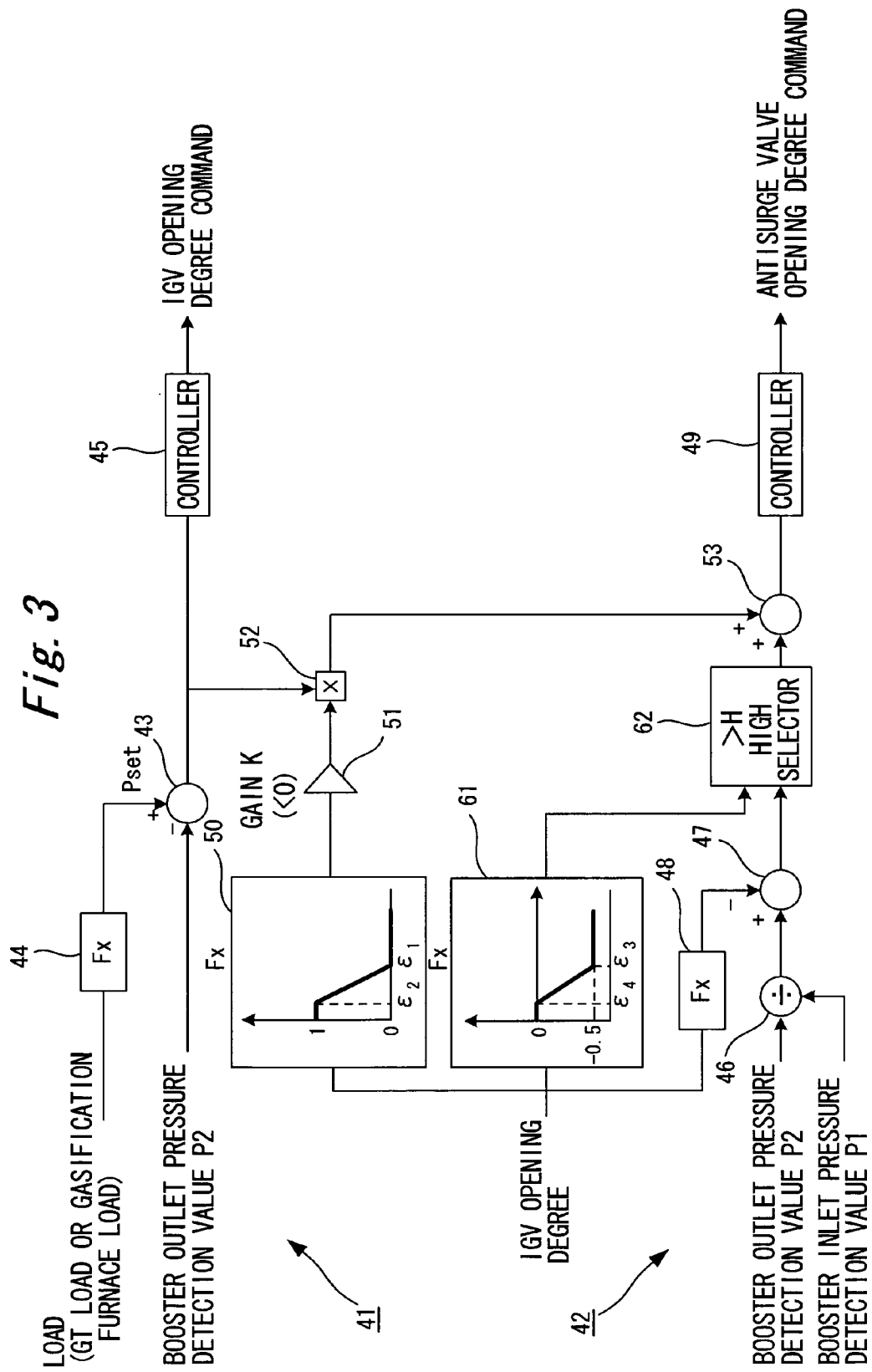
FIG. 3 is a block diagram showing a configuration of a control apparatus of an extracted air booster system of an integrated gasification combined cycle power plant according to a second embodiment of the present invention.

FIG. 3 is a block diagram showing the configuration of a control apparatus of an extracted air booster system of an integrated gasification combined cycle power plant according to a second embodiment of the present invention. It should be noted that the configuration of the plant is similar to that of the above-described first embodiment (FIG. 1) and therefore reference is made to FIG. 1. In addition, in FIG. 3, similar components to those of the above-described first embodiment (FIG. 2) are denoted by the same reference numerals and will not be further described in detail.

As shown in FIG. 3, in the control apparatus of the extracted air booster system of the integrated gasification combined cycle power plant of this second embodiment, the second control section 42 includes a function computing section 61 and a high selector section 62.

The function computing section 61 receives the degree of opening of the inlet guide vane 12, and outputs a value of $-0.5$ to 0 depending on this inlet guide vane opening degree. That is, in a case where the inlet guide vane opening degree is equal to or larger than a predetermined opening degree $\epsilon_3$, the function computing section 61 outputs $-0.5$ (this may be a negative value which is larger in absolute value.) On the other hand, in a case where the inlet guide vane opening degree becomes a low opening degree equal to or smaller than the predetermined opening degree $\epsilon_3$, the function computing section 61 outputs a value of $-0.5$ to 0 depending on the opening degree when the inlet guide vane opening degree is in the range between the predetermined opening degrees $\epsilon_3$ and a predetermined opening degree $\epsilon_4$. The function computing section 61 then outputs 0 when the inlet guide vane opening degree is in the range of the predetermined opening degree $\epsilon_4$ to the opening degree corresponding to the fully closed state.

The high selector section 62 selects and outputs the higher value out of the pressure ratio deviation $\Delta P2/P1$ outputted from the deviation computing section 47 and the output value from the function computing section 61. The add section 53 outputs a resultant value obtained by adding the output value from the high selector section 62 and the output value from the multiplication section 52.

Specifically, in a case where the pressure ratio P2/P1 is larger than the set pressure ratio value P2/P1set, the high selector section 62 selects and outputs the pressure ratio deviation $\Delta P2/P1$ even when the inlet guide vane 12 is fully closed. Accordingly, in this case, even when pressure control using the antisurge valve 13 is being performed because of the inlet guide vane 12 being fully closed, the controller 49 performs antisurge control in which the degree of opening of the antisurge valve 13 is controlled based on the pressure ratio deviation $\Delta P2/P1$ so that the pressure ratio P2/P1 becomes equal to the set pressure ratio value P2/P1set.

On the other hand, in a case where the pressure ratio P2/P1 is smaller than the set pressure ratio value P2/P1set and where the inlet guide vane opening degree is in the range of the predetermined opening degree $\epsilon_4$ to the opening degree corresponding to the fully closed state, the high selector section 62 selects and outputs 0. Accordingly, in this case, the controller 49 performs pressure control. In the pressure control, the degree of opening of the antisurge valve 13 is controlled based on the pressure deviation $\Delta P$ (output value of the multiplication section 52), so that the booster outlet pressure detection value P2 becomes equal to the set pressure value Pset.

In addition, in a case where the inlet guide vane opening degree is in the range of the predetermined opening degree $\epsilon_3$ to the predetermined opening degree $\epsilon_4$, the function computing section 61 outputs a value of −0.5 to 0 depending on the inlet guide vane opening degree. Accordingly, when the pressure ratio P2/P1 is smaller than the set pressure ratio value P2/P1set, the high selector section 62 selects and outputs the value having a smaller absolute value out of the output value from the function computing section 48 and the output value from the deviation computing section 47.

It should be noted that the deviation computing section 54 and the multiplication section 55 provided in the control apparatus of FIG. 2 are not provided in the control apparatus of FIG. 3, but may be provided in the control apparatus of FIG. 3.

As described above, in the control apparatus of the extracted air booster system of the integrated gasification combined cycle power plant of this second embodiment, in a case where the inlet guide vane 12 is fully closed, the second control section 42 basically performs pressure control using the antisurge valve 13. However, in a case where the pressure ratio P2/P1 is larger than the set pressure ratio value P2/P1set, the second control section 42 performs antisurge control even when the inlet guide vane 12 is fully closed. Accordingly, when there is a risk of entry into a surge region, the second control section 42 also performs antisurge control using the antisurge valve 13 in addition to pressure control for the purpose of preventing entry into the surge region more reliably. Thus, the extracted air booster 11 can be reliably protected.

Third Embodiment

Figure 4:
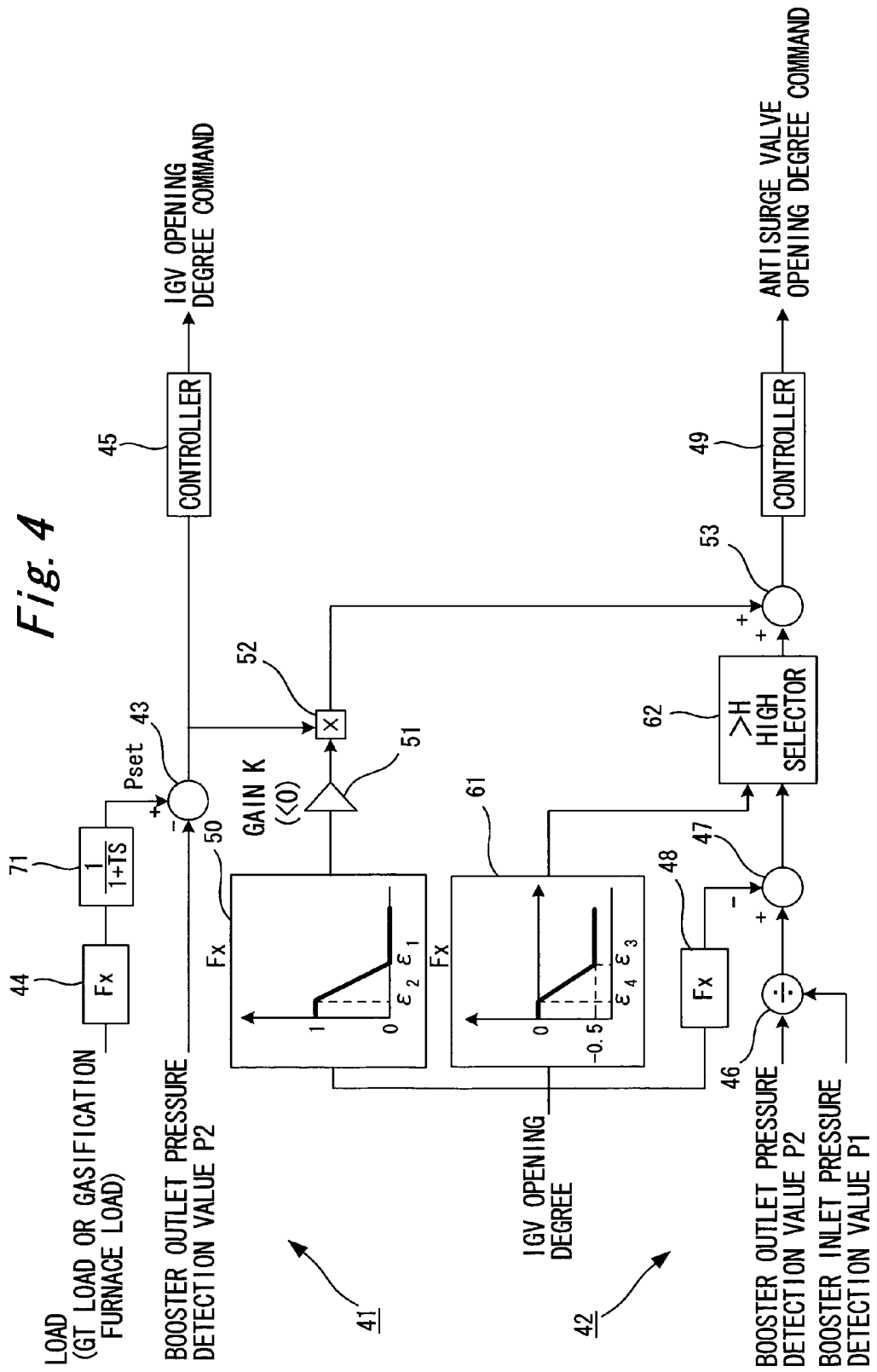
FIG. 4 is a block diagram showing a configuration of a control apparatus of an extracted air booster system of an integrated gasification combined cycle power plant according to a third embodiment of the present invention.

FIG. 4 is a block diagram showing a configuration of a control apparatus of an extracted air booster system of an integrated gasification combined cycle power plant according to a third embodiment of the present invention. It should be noted that the configuration of the plant is similar to that of the aforementioned first embodiment (FIG. 1) and therefore reference is made to FIG. 1. In addition, in FIG. 4, similar components to those of the above-described first and second embodiments (FIGS. 2 and 3) are denoted by the same reference numerals and will not be further described in detail.

As shown in FIG. 4, in the control apparatus of the extracted air booster system of the integrated gasification combined cycle power plant of this third embodiment, the first control section 41 includes a first order lag element section 71.

Accordingly, the output of the function computing section 44 does not directly become the set pressure value Pset, but the output value obtained by performing a first order lag process on the output of the function computing section 44 by the first order lag element section 71 becomes the set pressure value Pset. The first order lag element section 71 is provided in order to take a response delay of the plant into consideration, and to incorporate a delay taking account of the response delay of the plant into the set pressure value Pset, which is set using a load command as an input.

As described above, in the control apparatus of the extracted air booster system of the integrated gasification combined cycle power plant of this third embodiment, the first control section 41 incorporates the delay taking account of the response delay of the plant into the set pressure value Pset which is set using a load command as an input. This prevents impractical operations (of the inlet guide vane 12 and the antisurge valve 13) from being performed, and thus produces the effect of stabilizing the dynamic behavior of the plant.

Fourth Embodiment

Figure 5:
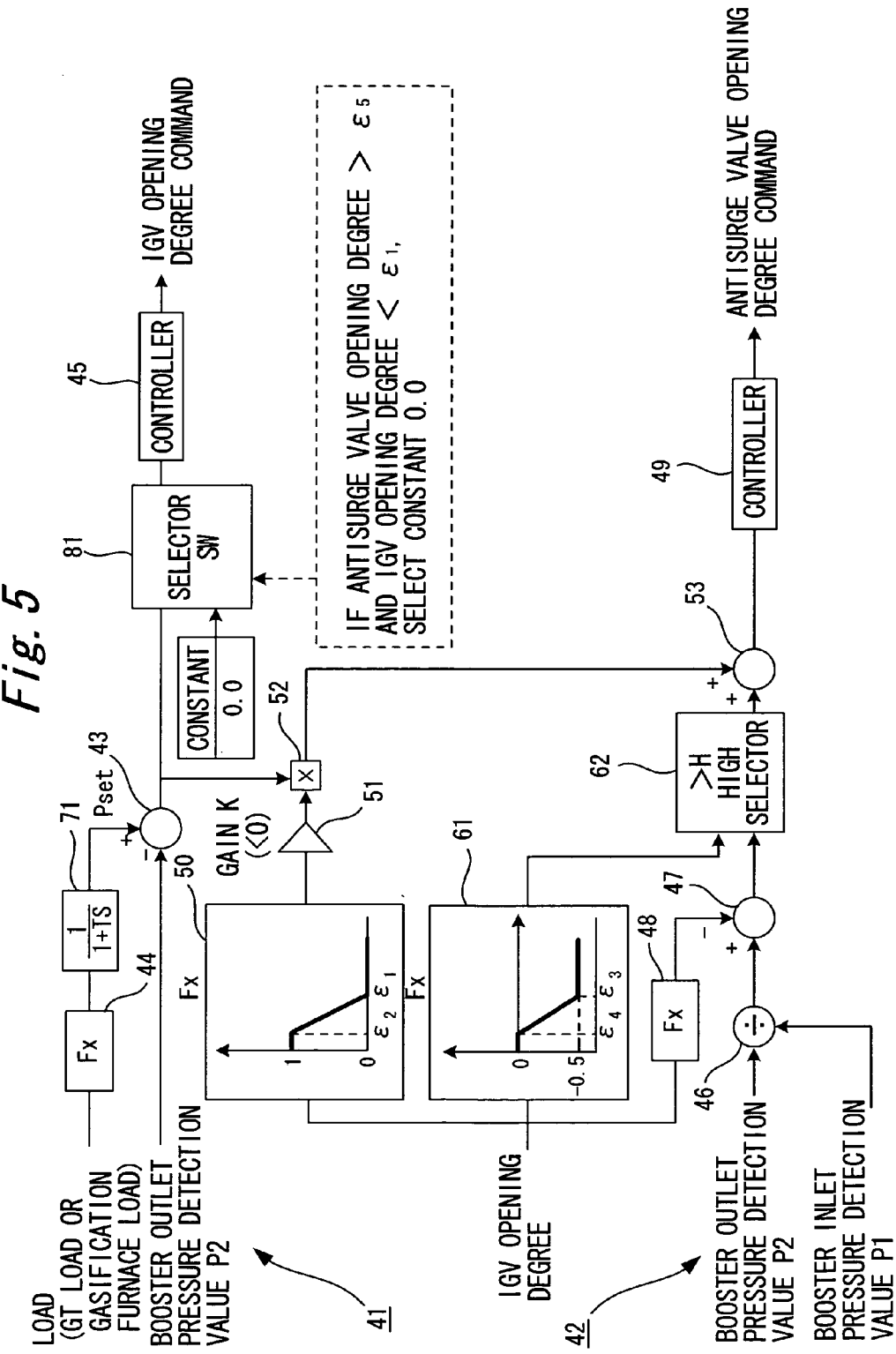
FIG. 5 is a block diagram showing a configuration of a control apparatus of an extracted air booster system of an integrated gasification combined cycle power plant according to a fourth embodiment of the present invention.

FIG. 5 is a block diagram showing a configuration of a control apparatus of an extracted air booster system of an integrated gasification combined cycle power plant according to a fourth embodiment of the present invention. It should be noted that the configuration of the plant is similar to that of the aforementioned first embodiment (FIG. 1) and therefore reference is made to FIG. 1. Further, in FIG. 5, similar components to those of the above-described first, second and third embodiments (FIGS. 2, 3 and 4) are denoted by the same reference numerals and will not be further described in detail.

As shown in FIG. 5, in the control apparatus of the extracted air booster system of the integrated gasification combined cycle power plant of this fourth embodiment, the first control section 41 includes a selector switch 81.

When the degree of opening of the antisurge valve 13 is larger than a predetermined opening degree $\epsilon_5$ and the degree of opening of the inlet guide vane 13 is smaller than the predetermined opening degree $\epsilon_1$, the selector switch 81 determines that pressure control is performed using the antisurge valve 13. The selector switch 81 then selects the constant 0.0 to output this value to the controller 45. In other cases, the selector switch 81 selects the output value (pressure deviation $\Delta P$) of the deviation computing section 43 to output this value to the controller 45. The predetermined opening degree $\epsilon_5$ is set at, for example, 5%. It should be noted that the predetermined opening degree to be compared with the inlet guide vane opening degree is not limited to $\epsilon_1$ and may be any value equal to or smaller than $\epsilon_1$. In this case, for example, the predetermined opening degree to be compared with the inlet guide vane opening degree is set at the opening degree corresponding to the fully closed state (30% opening degree or the like)+several percent. It should be noted that, as the degree of opening of the antisurge valve 13, an antisurge valve opening degree command outputted from the controller 49 of the second control section 42, a detection value of an opening degree detector for detecting the degree of opening of the antisurge valve 13, or the like can be used.

In a case where the selector switch 81 has selected the constant 0.0, the controller 45 maintains the inlet guide vane opening degree command at the value immediately before the constant 0.0 has been selected. That is, in this case, pressure control using the inlet guide vane 12 is not performed, but only pressure control using the antisurge valve 13 is performed.

As described above, in the control apparatus of the extracted air booster system of the integrated gasification combined cycle power plant of this fourth embodiment, when the degree of opening of the antisurge valve 13 is larger than the predetermined opening degree $\epsilon_5$ and the degree of opening of the inlet guide vane 12 is the opening degree corresponding to the fully closed state or smaller than the predetermined opening degree $\epsilon_1$, the first control section 41 determines that pressure control is performed using the antisurge valve 13, and does not control the degree of opening of the inlet guide vane 12 based on the pressure deviation $\Delta P$. This can prevent the antisurge valve 13 and the inlet guide vane 12 from simultaneously operating. Accordingly, the mutual interference therebetween can be prevented.

Fifth Embodiment

Figure 6:
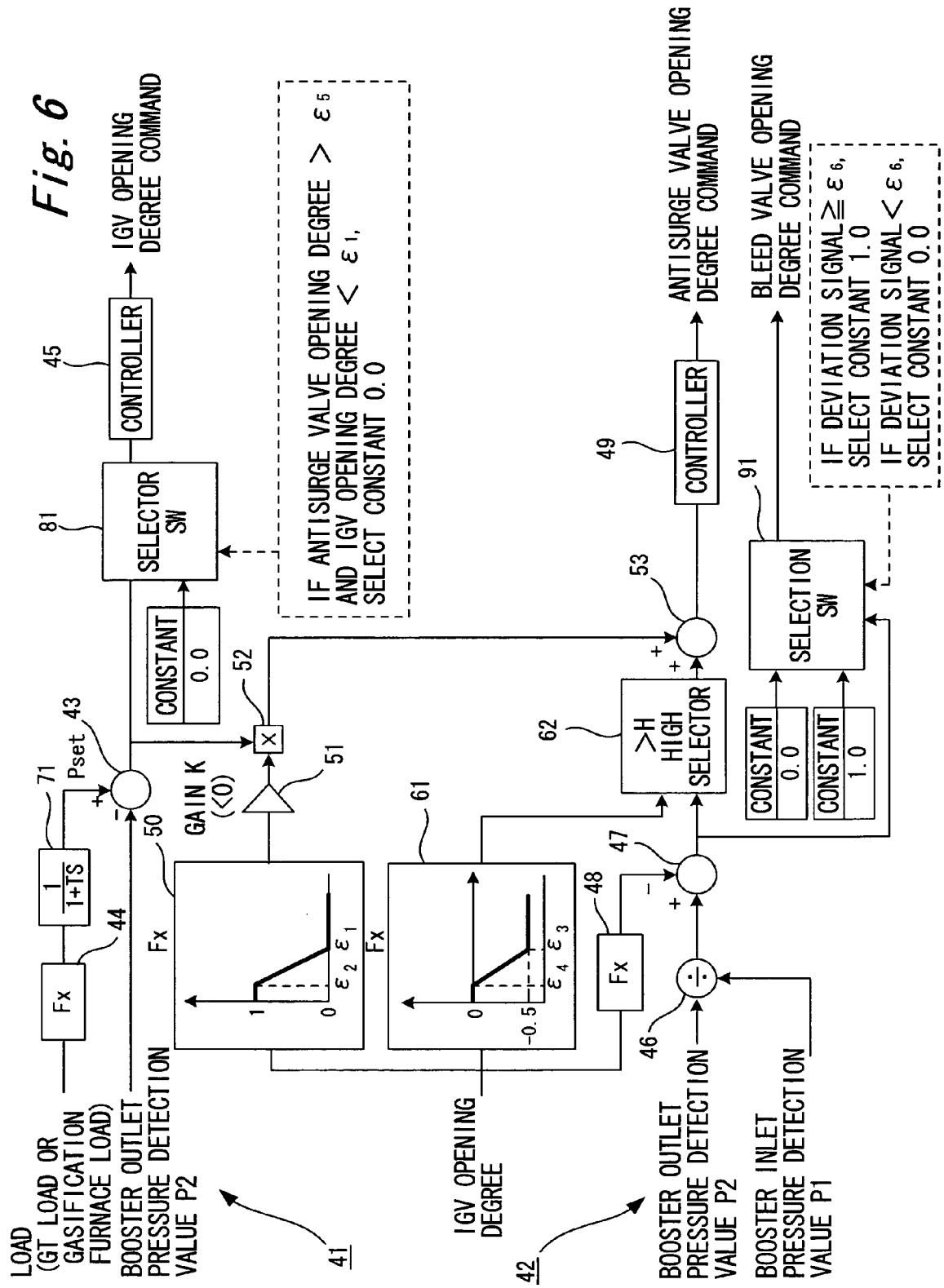
FIG. 6 is a block diagram showing a configuration of a control apparatus of an extracted air booster system of an integrated gasification combined cycle power plant according to a fifth embodiment of the present invention.

FIG. 6 is a block diagram showing a configuration of a control apparatus of an extracted air booster system of an integrated gasification combined cycle power plant according to a fifth embodiment of the present invention, and FIG. 7 is a graph showing a bleed valve control line. It should be noted that the configuration of the plant is similar to that of the aforementioned first embodiment (FIG. 1) and therefore reference is made to FIG. 1. In addition, in FIG. 6, similar components to those of the above-described first, second, third and fourth embodiments (FIGS. 2, 3, 4 and 5) are denoted by the same reference numerals and will not be further described in detail.

As shown in FIG. 6, in the control apparatus of the extracted air booster system of the integrated gasification combined cycle power plant of this fifth embodiment, the second control section 42 includes a selector switch 91.

When the pressure ratio deviation $\Delta P2/P1$ outputted from the deviation computing section 47 is equal to or larger than a predetermined set pressure ratio deviation value $\epsilon_6$, the selector switch 91 selects the constant 1.0. Then, the selector switch 91 outputs this value as a bleed valve opening degree command to the bleed valve 20. Accordingly, in this case, the bleed valve 20 is opened, and the extracted air is thereby vented to the atmosphere. It should be noted, however, that the set pressure ratio deviation value $\epsilon_6$ is set so that the bleed valve 20 operates after the operation of the antisurge valve 13. On the other hand, when the pressure ratio deviation $\Delta P2/P1$ is smaller than the set pressure ratio deviation value $\epsilon_6$, the selector switch 91 selects the constant 0.0. Then, the selector switch 91 outputs this value as the bleed valve opening degree command to the bleed valve 20. Accordingly, in this case, since the bleed valve 20 remains closed, the extracted air is thus not vented to the atmosphere. As shown in FIG. 7, a bleed valve control line (timing of the opening of the bleed valve 20) is set between a control line and a surge line.

As described above, in the control apparatus of the extracted air booster system of the integrated gasification combined cycle power plant of this fifth embodiment, when the pressure ratio deviation $\Delta P2/P1$ is equal to or larger than the predetermined value $\epsilon_6$, the second control section 42 opens the bleed valve 20 provided in the extracted air booster system 3, and thereby the second control section 42 vents the extracted air compressed by the extracted air booster 11 to the atmosphere. Accordingly, the antisurge control function can be backed by the bleed valve 20, and the surge protection function for the extracted air booster 11 can be enhanced.

The present invention relates to a control apparatus of an extracted air booster system of an integrated gasification combined cycle power plant, and is useful when applied to the case where the degrees of opening of an inlet guide vane and an antisurge valve are controlled (pressure control and antisurge control) in the extracted air booster system.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control apparatus of an extracted air booster system of an integrated gasification combined cycle power plant, the extracted air booster system including an extracted air booster for pressurizing air extracted from a compressor driven by a gas turbine, and for supplying the extracted air to a gasification furnace; an inlet guide vane provided to an inlet side of the extracted air booster; and an antisurge valve for returning the extracted air from an outlet side of the extracted air booster to the inlet side of the extracted air booster, the control apparatus comprising:
   a first control section for performing pressure control in which a degree of opening of the inlet guide vane is controlled based on a pressure deviation between a set pressure value and an outlet pressure detection value of the extracted air booster so that the outlet pressure detection value can become equal to the set pressure value, the outlet pressure detection value being detected by a first pressure detector; and
   a second control section for performing antisurge control in which a degree of opening of the antisurge valve is controlled based on a pressure ratio deviation between a set pressure ratio value and a pressure ratio of the outlet pressure detection value of the extracted air booster to an inlet pressure detection value of the extracted air booster so that the pressure ratio can become equal to the set pressure ratio value, the outlet pressure detection value being detected by the first pressure detector and the inlet pressure detection value being detected by a second pressure detector, wherein
   when the inlet guide vane is fully closed or has a small opening degree equal to or smaller than a predetermined opening degree, based on the pressure deviation, the second control section performs pressure control in which the degree of opening of the antisurge valve is controlled so that the outlet pressure detection value can become equal to the set pressure value, instead of or as well as the antisurge control.

2. The control apparatus according to claim 1, wherein when both the antisurge control based on the pressure ratio deviation and the pressure control based on the pressure deviation are performed, the second control section adjusts a ratio between the antisurge control and the pressure control, based on the degree of opening of the inlet guide vane.

3. The control apparatus according to claim 2, wherein in a case where the pressure ratio is larger than the set pressure ratio value, the second control section performs the antisurge control even when the inlet guide vane is fully closed.

4. The control apparatus according to claim 2, wherein the first control section incorporates a delay taking account of a response delay of the plant into the set pressure value which is set by using a load command as an input.

5. The control apparatus according to claim 2, wherein when the degree of opening of the antisurge valve is larger than a first predetermined opening degree, and concurrently when the degree of opening of the inlet guide vane is an opening degree corresponding to a fully closed state or is smaller than a second predetermined opening degree which is equal to or smaller than the predetermined opening degree, the first control section determines that the pressure is controlled using the antisurge valve, and does not control the degree of opening of the inlet guide vane based on the pressure deviation.

6. The control apparatus according to claim 2, wherein when the pressure ratio deviation is equal to or larger than a predetermined value, the second control section vents the extracted air to the atmosphere by opening a bleed valve provided in the extracted air booster system, the extracted air being compressed by the extracted air booster.

7. The control apparatus according to claim 1, wherein
in a case where the pressure ratio is larger than the set pressure ratio value, the second control section performs the antisurge control even when the inlet guide vane is fully closed.

8. The control apparatus according to claim 7, wherein
the first control section incorporates a delay taking account of a response delay of the plant into the set pressure value which is set by using a load command as an input.

9. The control apparatus according to claim 7, wherein
when the degree of opening of the antisurge valve is larger than a first predetermined opening degree, and concurrently when the degree of opening of the inlet guide vane is an opening degree corresponding to a fully closed state or is smaller than a second predetermined opening degree which is equal to or smaller than the predetermined opening degree, the first control section determines that the pressure is controlled using the antisurge valve, and does not control the degree of opening of the inlet guide vane based on the pressure deviation.

10. The control apparatus according to claim 7, wherein
when the pressure ratio deviation is equal to or larger than a predetermined value, the second control section vents the extracted air to the atmosphere by opening a bleed valve provided in the extracted air booster system, the extracted air being compressed by the extracted air booster.

11. The control apparatus according to claim 1, wherein
the first control section incorporates a delay taking account of a response delay of the plant into the set pressure value which is set by using a load command as an input.

12. The control apparatus according to claim 11, wherein
when the degree of opening of the antisurge valve is larger than a first predetermined opening degree, and concurrently when the degree of opening of the inlet guide vane is an opening degree corresponding to a fully closed state or is smaller than a second predetermined opening degree which is equal to or smaller than the predetermined opening degree, the first control section determines that the pressure is controlled using the antisurge valve, and does not control the degree of opening of the inlet guide vane based on the pressure deviation.

13. The control apparatus according to claim 11, wherein
when the pressure ratio deviation is equal to or larger than a predetermined value, the second control section vents the extracted air to the atmosphere by opening a bleed valve provided in the extracted air booster system, the extracted air being compressed by the extracted air booster.

14. The control apparatus according to claim 1, wherein
when the degree of opening of the antisurge valve is larger than a first predetermined opening degree, and concurrently when the degree of opening of the inlet guide vane is an opening degree corresponding to a fully closed state or is smaller than a second predetermined opening degree which is equal to or smaller than the predetermined opening degree, the first control section determines that the pressure is controlled using the antisurge valve, and does not control the degree of opening of the inlet guide vane based on the pressure deviation.

15. The control apparatus according to claim 14, wherein
when the pressure ratio deviation is equal to or larger than a predetermined value, the second control section vents the extracted air to the atmosphere by opening a bleed valve provided in the extracted air booster system, the extracted air being compressed by the extracted air booster.

16. The control apparatus according to claim 1, wherein
when the pressure ratio deviation is equal to or larger than a predetermined value, the second control section vents the extracted air to the atmosphere by opening a bleed valve provided in the extracted air booster system, the extracted air being compressed by the extracted air booster.

* * * * *